US009298976B2

(12) United States Patent
Je et al.

(10) Patent No.: US 9,298,976 B2
(45) Date of Patent: Mar. 29, 2016

(54) METHOD, APPARATUS AND COMPUTER READABLE RECORDING MEDIUM FOR MANAGING A REFERENCE FACE DATABASE TO IMPROVE FACE RECOGNITION PERFORMANCE UNDER A RESTRICTED MEMORY ENVIRONMENT

(71) Applicants: Hong Mo Je, Seoul (KR); Hyung Soo Lee, Seoul (KR); Woo Ju Ryu, Kyunggi (KR)

(72) Inventors: Hong Mo Je, Seoul (KR); Hyung Soo Lee, Seoul (KR); Woo Ju Ryu, Kyunggi (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,628

(22) PCT Filed: Sep. 27, 2012

(86) PCT No.: PCT/KR2012/007854
§ 371 (c)(1),
(2) Date: Dec. 27, 2013

(87) PCT Pub. No.: WO2013/048162
PCT Pub. Date: Apr. 4, 2013

(65) Prior Publication Data
US 2014/0226877 A1   Aug. 14, 2014

(30) Foreign Application Priority Data
Sep. 27, 2011  (KR) ........................ 10-2011-0097796

(51) Int. Cl.
G06K 9/00 (2006.01)
G06F 17/30 (2006.01)

(52) U.S. Cl.
CPC ........ G06K 9/00288 (2013.01); G06F 17/3028 (2013.01); G06K 9/00926 (2013.01)

(58) Field of Classification Search
USPC .......................................................... 382/112
See application file for complete search history.

(56) References Cited

U.S. PATENT DOCUMENTS 7,627,406 B2 * 12/2009 Wang et al. .................. 701/32.7
2009/0185723 A1 * 7/2009 Kurtz et al. .................. 382/118

FOREIGN PATENT DOCUMENTS

JP   H07-262379   10/1995
JP   H10-275236   10/1998
(Continued)

OTHER PUBLICATIONS

G. Huang M. Ramesh T Berg and E Learned Miller. Lableled faces in the wild: A database for studying face recognition in unconstrained enviroments. Technical Report -7-49 UMass, 2007. Accessed on May 29, 2015 <http://vis-www.cs.umass.edu/lfw/lfw.pdf>.*
(Continued)

*Primary Examiner* — Utpal Shah
*Assistant Examiner* — Kate R Duffy
(74) *Attorney, Agent, or Firm* — Blakely, Sokoloff, Taylor & Zafman LLP

(57) ABSTRACT

Various embodiments of the present disclosure presents a method for managing a reference face database to improve face recognition performance under a restricted memory environment, said method comprising: acquiring a new input face image; determining a classification condition corresponding to the input face image with reference to classification conditions of existing registered face images of a reference face database used for face recognition; and if the classification condition corresponding to the input face image is a specific classification condition and the value of the face image corresponding to the specific classification condition in the reference face database is less than a preset threshold value, selecting the input face image as an image that can be additionally registered to the reference face database.

18 Claims, 5 Drawing Sheets

(56) References Cited

FOREIGN PATENT DOCUMENTS

| | | |
|---|---|---|
| JP | 2002-259980 | 9/2002 |
| JP | 2004-342073 | 12/2004 |
| JP | 2006-313428 | 11/2006 |
| JP | 2008-269582 | 11/2008 |
| JP | 2008/146539 | 12/2008 |
| JP | 2009-258990 | 11/2009 |
| JP | 2010/027035 | 2/2010 |
| KR | 1020050053130 | 6/2005 |
| KR | 1020090010855 | 1/2009 |
| KR | 1020090020390 | 2/2009 |
| KR | 1020090031084 | 3/2009 |
| KR | 1020090057796 | 6/2009 |
| KR | 1020110067716 | 6/2011 |

OTHER PUBLICATIONS

Yongmin Li, et. al, "Recognising Trajectories of Facial Identities Using Kernel Discriminant Analysis," Department of Computer Science, Queen Mary, University of London, 10 pages (2001). Accessed on May 29, 2015 <http://www.brunel.ac.uk/~csstyyl/papers/ivc2003.pdf>.*
Japanese Office Action, JP2014-531738, 7 pages, Jan. 27, 2015.
PCT Search Report, PCT/KR2012/007854, Feb. 19, 2013, 6 pages.
Office Action from Counterpart JP Patent Application No. 2014-531738, Mailed Sep. 29, 2015, 3 pages.

* cited by examiner

METHOD, APPARATUS AND COMPUTER READABLE RECORDING MEDIUM FOR MANAGING A REFERENCE FACE DATABASE TO IMPROVE FACE RECOGNITION PERFORMANCE UNDER A RESTRICTED MEMORY ENVIRONMENT

The present patent application is a U.S. National Phase Application under 35 U.S.C. 371 of International Application No. PCT/KR2012/007854 filed Sep. 27, 2012, which claims priority from Korean Application No. 10-2011-0097796, filed Sep. 27, 2011, the contents of which are incorporated herein in their entirety by reference.

TECHNICAL FIELD

The present disclosure relates to a method, apparatus and computer-readable recording medium for additionally registering and deleting a facial image to improve the recognition rate of a face included in multimedia content (a picture or a moving image) acquired from a digital image pickup device (a digital camcoder, a digital camera, a camera phone or the like) using face recognition, and more specifically, to selecting a facial image to be additionally registered in a database and substituting the facial image for a previously stored facial image in order to improve performance of face recognition when taking a picture using a digital image pickup device having limited memory resources.

BACKGROUND

Hand in hand with the expansion of the camera phone market including the market for smart phones, digital camcorders, digital cameras and the like, there have been advancements in techniques for photographing pictures or moving images. One of those is a technique for recognizing a face of a person in an image photographed using a digital image pickup device so as to automatically focus on the face or automatically photograph the person when the person makes a specific facial expression.

However, in an ordinary environment, images of faces photographed from diverse angles, various facial expressions, and lighting (natural light, artificial light or the like) from various directions are the causes for degradation of performance in recognizing the face. In an effort to overcome the above difficulties, in cases where basic reference facial images for face recognition are registered in a database, an improvement in performance can be obtained by pre-registering as many diverse facial images as possible. However, since memory resources of the digital image pickup device such as a digital camera or a camera phone are limited, there is a problem of not having enough resources to store all of the available facial images.

Accordingly, there is a need for an efficient method of selecting and registering, among newly photographed or input facial images, facial images that would effectively improve performance of face recognition operations and deleting some of the previously stored facial images in view of the limited memory resources.

DETAILED DESCRIPTION OF INVENTION

Technical Problem

Therefore, an object of the present disclosure is to solve the above-described problems.

In addition, another object of the present disclosure is to provide a method of selecting and registering a facial image that would provide a high face recognition rate even under an environment where a pose, a facial expression, an angle of lighting or the like changes when taking the facial image with a camera.

Still another object of the present disclosure is to provide a method of deleting the registered images that are most unnecessary for recognizing a face among previously registered facial images, in order to efficiently use the limited memory resources of a digital image pickup device.

Technical Solution

The representative configurations of the present disclosure for achieving the above-described objects are as follows.

According to an aspect of the present disclosure, there is provided a method of managing a reference face database for improving performance of face recognition in a limited memory environment. The method includes acquiring a new input facial image; determining a classification condition relevant to the input facial image with reference to classification conditions of facial images previously registered in the reference face database used for face recognition; and selecting the input facial image as an image that can be additionally registered in the reference face database, if the classification condition relevant to the input facial image is a specific classification condition and a facial image relevant to the specific classification condition is less sufficient than a preset threshold value in the reference face database.

According to another aspect of the present disclosure, there is provided an apparatus for managing a reference face database for improving performance of face recognition in a limited memory environment. The apparatus includes the reference face database for recording a facial image used for face recognition; and an additional registration face selection unit for determining a classification condition relevant to a new input facial image with reference to classification conditions of facial images previously registered in the reference face database, if the input facial image is acquired, and selecting the input facial image as an image that can be additionally registered in the reference face database, if the classification condition relevant to the input facial image is a specific classification condition and a facial image relevant to the specific classification condition is less sufficient than a preset threshold value in the reference face database. In addition, there are provided other methods and apparatuses for implementing the present disclosure and a computer-readable recording medium for executing the above-described method.

Technical Effects

According to the present disclosure, since the most effective facial images can be selected and additionally registered in a reference face database for face recognition, face recognition can be provided at a high recognition rate when a person is photographed using a digital image pickup device. Further, insufficient memory resources can be efficiently used since some of the most ineffective images from among the previously registered facial images are deleted for facial images that are to be newly added to the reference face database.

EMBODIMENTS

Figure 1:
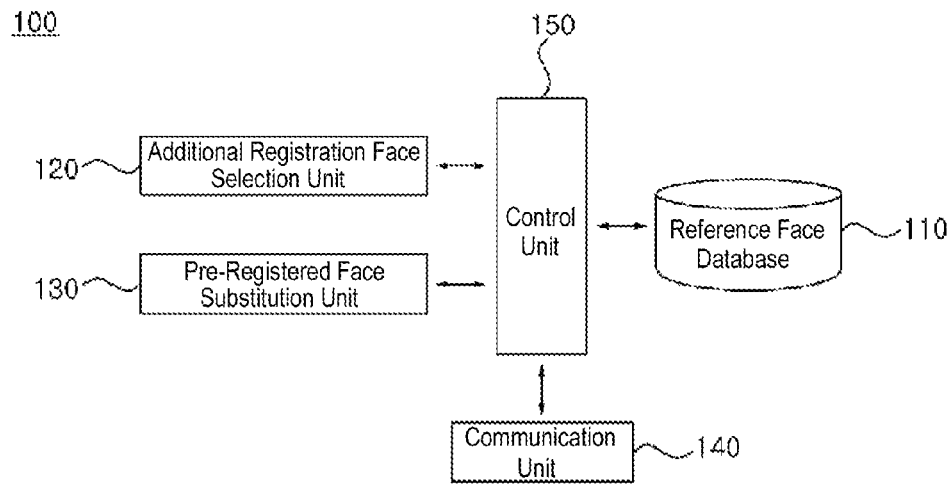
FIG. 1 is a diagram showing the configuration of a digital apparatus in accordance with an embodiment of the present disclosure.

In the following detailed description of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined by the appended claims, appropriately interpreted, along with the full range equivalent to what the claims claim. In the drawings, like reference numbers refer to the same or similar functions through diverse ways.

Hereinafter, various embodiments of the present disclosure will be described in detail with reference to the accompanying drawings in order that those skilled in the art can implement the present disclosure easily.

In order to focus on the face of a person or a specific facial expression when a picture is taken using a camera, first, the face of the person included in the photographed image should be detected and recognized by comparing the detected face with previously stored reference facial images included in a database. However, if the reference facial image for face recognition is an image taken with only one facial expression and posed under the same lighting, the face recognition rate cannot but be considerably low. This is because, although an image of a person A is included in the reference facial images stored in the database, if the face of the person A is photographed with a facial expression, a pose and a lighting direction that are different from those of the reference facial image of the same person stored in the database, it would be highly likely that the person A in the photographed image could not be correctly recognized. Various facial images of the corresponding person may be stored in the database in order to enhance the face recognition rate. However, there is a problem in that the memory storage space of a portable device, i.e., a digital camera or a camera phone, is too small to store all the various facial images.

The present disclosure proposes a method of (a) selecting the most effective facial image and additionally registering the selected facial image in a reference face database for face recognition, so as to enhance the face recognition rate while using limited memory storage space, and (b) deleting some of the most ineffective images from among previously registered facial images for the facial image newly added to the reference face database. The present disclosure further proposes an apparatus to which the above method is applied and a computer-readable recording medium for recording and implementing the method.

FIG. 1 is a diagram showing the configuration of a digital apparatus 100 in accordance with an embodiment of the present disclosure.

Referring to FIG. 1, the digital apparatus 100 includes a reference face database 110, an additional registration face selection unit 120, a pre-registered face substitution unit 130, a communication unit 140, and a control unit 150.

According to an embodiment of the present disclosure, at least some of the reference face database 110, the additional registration face selection unit 120, the pre-registered face substitution unit 130, the communication unit 140, and the control unit 150 may be program modules included in the digital apparatus 100 or communicating with the digital apparatus 100. However, FIG. 1 exemplifies the reference face database 110, the additional registration face selection unit 120, the pre-registered face substitution unit 130, the communication unit 140 and the control unit 150 as being all included in the digital apparatus 100. At least some of the program modules may be included in the digital apparatus 100 in the form of an operating system, an application program, or other program modules and may be physically stored in a variety of well-known memory devices. In addition, at least some of the program modules may be stored in a remote memory device capable of communicating with the digital apparatus 100. Such program modules comprehensively include routines, subroutines, programs, objects, components, data structures, and the like for performing a specific task or executing a specific abstract data type, which will be described later, but are not limited thereto.

First, the reference face database 110 may record data for each angle of a face of a specific person, such as a picture taken from the front side of the person, a picture taken by rotating the face 45 degrees to the right side, a picture taken by rotating the face 45 degrees to the left side, a picture taken by rotating the face 90 degrees to the right side, a picture taken by rotating the face 90 degrees to the left side, and the like (see FIG. 3 described later). Here, the aforementioned angles are given only as examples, and, in addition thereto, three-dimensionally expanded various modifications, such as a picture taken with the face raised 30 degrees upward, a picture taken with the face tilted 60 degrees upward, and the like, may also be used.

Additionally, the reference face database 110 may record data for each angle of light casted on the face of a specific person, such as a picture with a light cast from the front side of the person, a picture with a light cast from the right side of the face, a picture with a light cast from the left side of the face, a picture with a light cast from the bottom side of the face, a picture with a light cast from the top side of the face, and the like (not shown). Here, the aforementioned light angles are provided only as examples, and, in addition thereto, three-dimensionally expanded various modifications, such as a picture with a light cast from 30 degrees upper left side of the face, a picture with a light cast from 60 degrees lower right side of the face, a picture with a light cast from the middle between the front and right sides of the face, and the like, may also be possible. In addition, pictures of a person may be classified and recorded according to the type of a light source used (an indoor and outdoor light source, natural light, ambient light, and the like).

Next, if a new input face image of a specific person is input, the additional registration face selection unit 120 may perform a function of determining whether or not to store the new input facial image in the reference face database 110. In this instance, the additional registration face selection unit 120 may also determine whether or not to store the new input facial image in the reference face database 110 after reviewing a facial image of the specific person previously stored in the reference face database 110 as described above.

Figure 2:
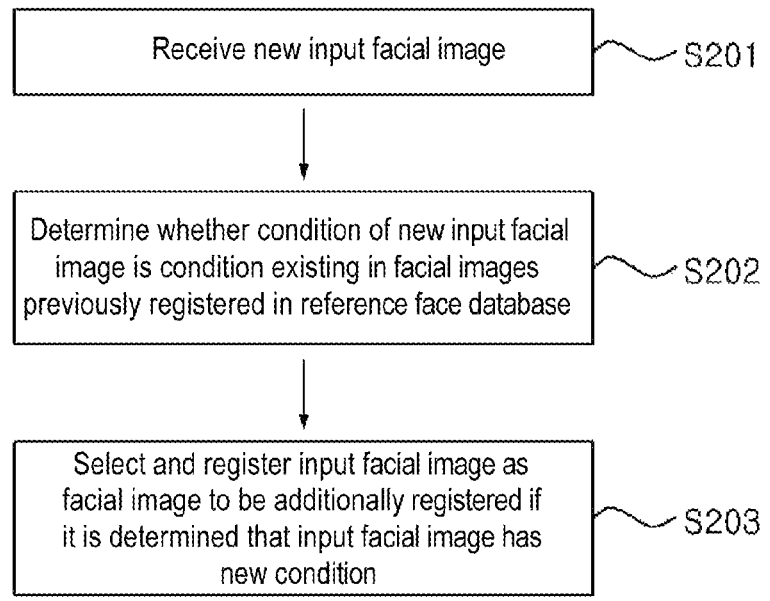
FIG. 2 is a flowchart illustrating a method of selecting a facial image to be additionally registered in accordance with an embodiment of the present disclosure.

FIG. 2 is a flowchart illustrating a method of selecting a facial image to be additionally registered in accordance with an embodiment of the present disclosure.

In order to select a facial image to be recommended and registered as a new input facial image, the additional registration face selection unit 120 according to the embodiment of the present disclosure provides a means for recognizing whether or not the new input facial image has a new registration condition for face recognition and selecting the new input facial image as a candidate face to be registered in the reference face database 110 if it is determined that the condition of the new input face image is satisfied.

Referring to FIG. 2, the additional registration face selection unit 120 according to the embodiment of the present disclosure first receives a new facial image from the outside of the reference face database 110, which stores previously registered facial images (S201). The new facial image received from the outside may be a newly photographed image or an image previously stored in an external memory space. Additionally, even the data already stored in the reference face database 110 may be subject to step S201, in cases where it has not yet been determined whether such data satisfies a new registration condition.

Next, it is determined whether or not the condition of the new input facial image is a condition existing in facial images previously registered in the reference face database 110 (S202).

Here, the condition of a new input facial image is a criterion for classifying the new input facial image based on the features of the input facial image, and may include conditions related to an external environment, such as a photographing posture, i.e., a pose or a facial expression shown in the input facial image, an angle of photographing the facial image, a direction of light radiated on the face, and the like. For example, when the new input facial image is classified according to a facial expression, the criteria may be a laughing face, an expressionless face, an angry face, a frowning face, and the like, and the facial image is classified based on these criteria. In addition, when the new input facial image is classified according to an angle of photographing the face, the criteria may be whether or not the face is photographed from the front side, photographed from the left or right side, photographed to be slightly skewed from the front side to the left or right side, photographed to be severely skewed from the front side to the left or right side, photographed from slightly upper front side, photographed from slightly lower front side, photographed from considerably upper front side, photographed from considerably lower front side, or photographed from the upper left, lower left, upper right or lower right of the front side and the like, and the input facial image is classified based on these criteria. When the new input facial image is classified according to a lighting direction of the image, the criteria may be the front side direction of the face, the back side direction of the face, the left or right side direction of the face, the upper or lower side direction of the face and the like, and the input facial image is classified based on these criteria.

Specifically, in the case of an input facial image of the person A, the input facial image is classified according to various features, and it is determined whether or not the reference face database 110 already stores a facial image of the person A with the same condition as the above classified condition of the input facial image (e.g., at least one of a pose, a facial expression, and an angle of light of the input facial image). For example, in the case where only facial images photographed from the right side and the front side are included in the facial images of the person A registered in the reference face database 110, if a newly input facial image is an image photographed from the left side of the face of the person A, since data of a facial image photographed from the left side is not included in the reference face database 110 (i.e., since the condition of photographing the face of the person A from the left side is a condition that is not included in the reference face database 110), the new input facial image may be selected as an image that may be additionally registered in the reference face database 110 and registered therein (S203).

In addition, various aspects of the embodiments may be applied not only to the specialized case as described above, but also to a general case as follows. For example, when a classification condition relevant to the input facial image is determined with reference to the classification conditions of the facial images previously registered in the reference face database 110 and a classification condition relevant to the input facial image is a specific classification condition, it is possible to consider a method of selecting the input facial image as an image that may be additionally registered in the reference face database when a facial image relevant to the specific classification condition is less sufficient than a preset threshold value in the reference face database. Here, whether or not a facial image relevant to the specific classification condition is less sufficient than a preset threshold value may be determined only for a specific person or may be determined considering a general person.

Figure 3:
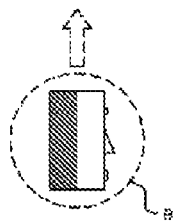
FIG. 3 is a diagram of a reference face database showing a process of selecting a facial image to be additionally registered by a digital apparatus using a method in accordance with an embodiment of the present disclosure.

FIG. 3 is a view showing a process of selecting a facial image to be additionally registered by the additional registration face selection unit 120 using a method in accordance with an embodiment of the present disclosure.

The method of selecting a facial image in FIG. 3 shows an example of determining whether or not a facial image is a new facial image on the basis of an angle of photographing a face. Referring to FIG. 3, when there are facial images a to d for the person A among the facial images previously stored in the reference face database 110 for face recognition (the facial image a is a picture of a front view, the facial image b is a picture of a face rotated 45 degrees to the right side, the facial image c is a picture of a face rotated 45 degrees to the left side, and the facial image d is a picture of a face rotated 90 degrees to the right side), if a newly input facial image is a facial image of the person A and is the same as a facial image e (the facial image e is a picture of a face rotated 90 degrees to the left side), the additional registration face selection unit 120 according to the present disclosure determines whether the photographing angle of the facial image of the person A included in the facial image e is in a class different from the photographing angle of the facial images of the person A previously stored in the reference face database 110 or in the same class that includes the photographing angle of the facial image stored in the reference face database 110. In this instance, when it is determined that the photographing angle of the new facial image is included in the class of the photographing angle of the facial image stored in the reference face database 110 (the two photographing angles need not be exactly matched to each other, and if they are only within a range of similarity sufficient in recognizing a face), it may be determined as a type of a facial image previously stored in the reference face database 110. For example, if a newly input facial image f (not shown) of the person A is a picture of a face rotated 50 degrees to the right side, since the new facial image is within a similar range to the facial image b of the person A previously stored in the reference face database 110, the additional registration face selection unit 120 may not register the newly input facial image f in the reference face database 110.

However, as shown in FIG. 3, since the photographing angle of the newly input facial image e is the photographing angle of a picture of a face of the person A rotated 90 degrees to the left side and thus is not included in the photographing angle of a facial image of the person A previously registered in the reference face database 110, the additional registration face selection unit 120 may add the new input facial image e of the person A to the reference face database 110.

Although a facial image is classified based only on the photographing angle and a new facial image is identified and additionally registered in FIG. 3, a photographing apparatus according to an embodiment of the present disclosure for selecting a facial image to be newly registered may be used by combining at least some of the photographing angle, facial expression, lighting and the like. This is because, if lighting directions are different, a photographing apparatus such as a digital camera may determine images of the same photographing angle as different faces and accordingly probability of face recognition may be lowered. Thus, if various facial images in which different lighting directions are applied to respective photographing angles or facial expressions are determined on different conditions and recorded in the reference face database 110 for each condition, the facial recognition rate will be enhanced.

Figure 4:
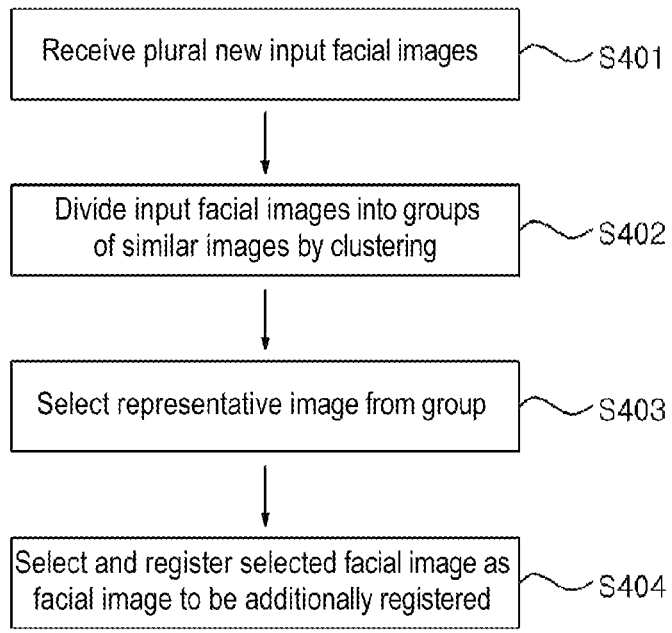
FIG. 4 is a flowchart illustrating a method of selecting a facial image to be additionally registered in accordance with another embodiment of the present disclosure.

FIG. 4 is a flowchart illustrating a method of selecting a facial image to be additionally registered in accordance with another embodiment of the present disclosure.

In order to select a facial image to be recommended and registered as a new facial image, an additional registration face selection unit 120 according to the other embodiment of the present disclosure may propose a method of clustering at least one candidate facial image from the outside of the reference face database 110 based on a specific face recognition metric, and then automatically recommending a representative facial image that can be used for easily recognizing the other facial images.

Although the method of selecting a facial image in the embodiment of FIG. 2 includes determining whether or not to select a new input facial image received from the outside of the reference face database 110 as a facial image to be recorded in the reference face database 110 by individually determining the new input facial image, selecting a facial image according to the other embodiment of the present disclosure as shown in FIG. 4 may further include receiving a plurality of new facial images from the outside of the reference face database 110, selecting a facial image representing the new facial images, and recommending the selected facial image as a facial image to be registered in the reference face database 110.

Referring to FIG. 4, the additional registration face selection unit 120 according to the other embodiment of the present disclosure first receives one or more new input facial images from the outside of the reference face database 110 (S401). Then, the additional registration face selection unit 120 divides the received new input facial images into groups of similar images by clustering the new input facial images based on a face recognition metric (S402). The clustering refers to calculating a matching value for face recognition for each image and grouping the input facial images into groups of highly similar images based on the calculated matching values or into groups of images having a short distance (e.g., Euclidean distance) between descriptors of key points. That is, the transferred new input facial images are images different from one another, and the different images need to be divided into groups of facial images of a similar type, i.e., a pose or facial expression of a similar type, a photographing angle of a similar type, lighting of a similar type or the like.

Then, the additional registration face selection unit 120 selects a facial image, which corresponds to a centroid image or a mean image among the grouped facial images, as a representative facial image of the group (S403). This process means that a standard facial image which can most adequately represent a group among the facial images grouped by similar images is selected as a representative image of the group. For example, a facial image having a matching value closest to a centroid matching value or mean matching value among the matching values calculated in the respective images in the clustering process can be selected as a representative facial image of the group. In other words, facial images grouped by facial images of the front side are actually not all the same images and have different facial expressions or slightly different photographing angles, and this may be a process of selecting a standard image of the grouped facial images as a representative image.

The additional registration face selection unit 120 selects such facial images as images that can be added to the facial images previously registered in the reference face database 110, and registers the facial images in the reference face database 110 (S404).

In addition to the embodiments described above, a modified example as follows may also be used. For example, in additionally registering a representative facial image in the reference face database 110, a classification condition relevant to the representative facial image is determined with reference to the classification conditions of the facial images previously registered in the reference face database 110. If the classification condition relevant to the representative facial image is a specific classification condition, the representative facial image may be additionally registered in the reference face database 110 only when a facial image relevant to the specific classification condition is less sufficient than a preset threshold value in the reference face database 110.

The pre-registered face substitution unit 130 may, from among the facial images stored in the reference face database 110, select and delete facial images previously stored in the reference face database 110 as many as new input facial images are added or as many as needed for securing a desired extra storage space (that is, it may be said that an efficient facial data is substituted for face recognition by deleting a previously registered facial image in place of a newly registered input facial image).

Figure 5:
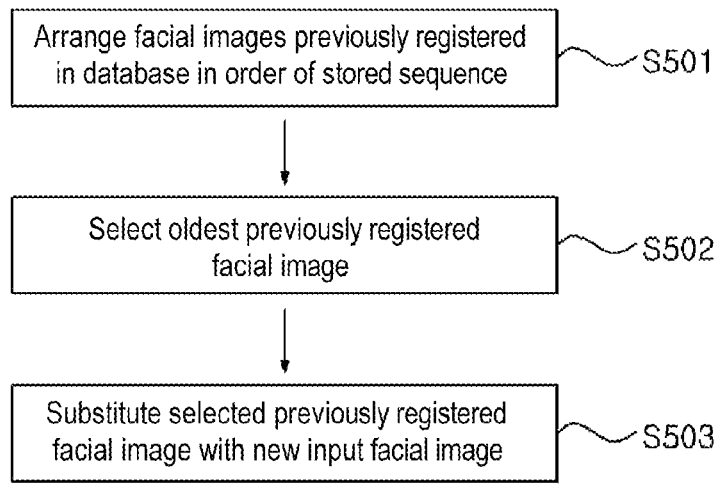
FIGS. 5 to 8 are flowcharts illustrating methods of selecting and deleting a facial image ineffective for recognizing a face from among facial images previously registered in a reference face database in accordance with an embodiment of the present disclosure.

FIG. 5 is a flowchart illustrating a method of selecting a facial image (i.e., a deleted facial image) to be substituted with a new input facial image from among facial images previously registered in the reference face database 110 by the pre-registered face substitution unit 130 in accordance with an embodiment of the present disclosure.

The pre-registered face substitution unit 130 according to an embodiment of the present disclosure may select a facial image that was stored in the reference face database 110 for the longest time as the image to be substituted with a new input facial image from among previously registered facial images.

Referring to FIG. 5, the pre-registered face substitution unit 130 according to the embodiment of the present disclosure first ranks the facial images previously stored in the reference face database 110 in order of stored sequence to select a previously registered facial image to be substituted (S501). In this instance, a case of simply referencing information on the rank already determined in order of stored sequence may also be assumed. Then, the oldest previously registered facial image may be selected (S502) and deleted. In this instance, the selected previously registered facial image may also be substituted with a new input facial image (S503).

Figure 6:
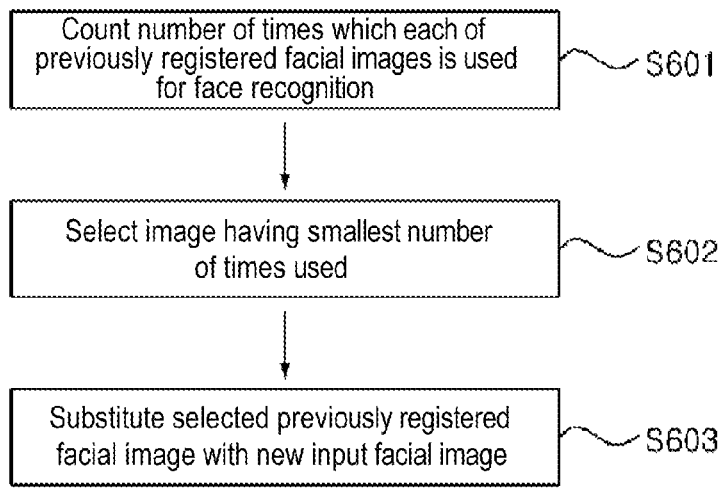

FIG. 6 is a flowchart illustrating a method of selecting a facial image to be substituted with a new facial image from among the previously registered facial images by the pre-registered face substitution unit 130 in accordance with another embodiment of the present disclosure.

Selecting a facial image to be substituted with a new input facial image from among the previously registered facial images may include selecting and substituting a facial image by counting the number of matches made in successful face recognition operations and determining a previously registered facial image having the smallest matching number as being the least contributing to the recognition performance.

Referring to FIG. 6, the pre-registered face substitution unit 130, in some embodiments, first counts the number of times each of the facial images previously registered in the reference face database 110 were used for face recognition in order to select a previously registered image to be substituted (S601). For example, if twenty facial images are stored in the reference face database 110, the number of times each of the first to twentieth facial images were used for face recognition (i.e., how many times each of the facial images in the reference face database 110, which are used as a target for similarity matching in order to recognize the identity of a face of a newly input image, is used for similarity matching) is counted in a cumulative manner from a preset time point to the present time point.

Then, the pre-registered face substitution unit 130 may select a previously registered facial image having the smallest number of times used for the face recognition (S602) and delete it. At this point, the selected previously registered facial image may also be substituted with a new input facial image (S603).

That is, for example, although there is an image photographed from the top side among the previously registered facial images stored in the reference face database 110, there are very few images photographed from the top side in among the newly photographed images. In other words, there may be cases where the previously registered image photographed from the top side is used very rarely for face recognition. In such cases, the pre-registered face substitution unit 130 determines the previously registered facial image as being least contributable to recognition performance, and selects the previously registered facial image as a target to be deleted or substituted.

Figure 7:
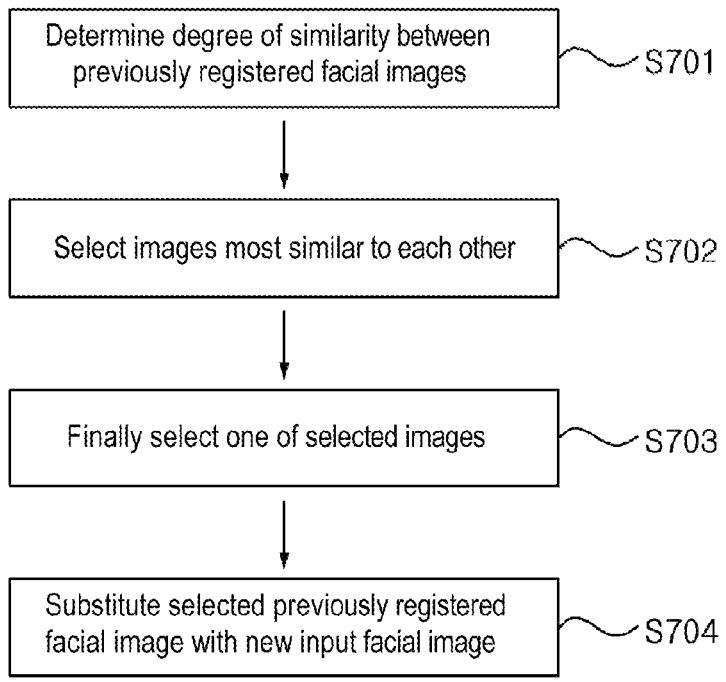

FIG. 7 is a flowchart illustrating a method of selecting a facial image to be substituted with a new facial image from among the previously registered facial images by the pre-registered face substitution unit 130 in accordance with still another embodiment of the present disclosure.

In order to select a facial image to be substituted with a new input facial image from among the previously registered facial images, the pre-registered face substitution unit 130, in some embodiments, may review the similarity between the facial images stored in the reference face database 110 by comparing the facial images and selecting one of the most similar facial images as an image to be substituted. If there are two or more identical facial images, this may result in occupying more space in the reference face database 110 while the same face recognition rate is maintained, as compared to the case where there is only one identical facial image, and thus, it is determined that one of the identical facial images may be deleted.

Referring to FIG. 7, the method of selecting a previously registered facial image to be substituted first includes determining the degree of similarity between the facial images previously registered in the reference face database 110 (S701) and selecting the most similar facial images (S702). In this instance, the process of determining the similarity may use a method of using a difference between matching values for face recognition in the facial images registered in the reference face database 110 (e.g., targeting the facial image of the person A) to determine that the similarity between two corresponding facial images is high as the difference between matching values is small. Then, one of the two facial images determined as being most similar to each other may be finally selected as an image to be substituted (S703), and this image can be deleted. In this instance, the selected previously registered facial image may also be substituted with a new input facial image (S704).

Figure 8:
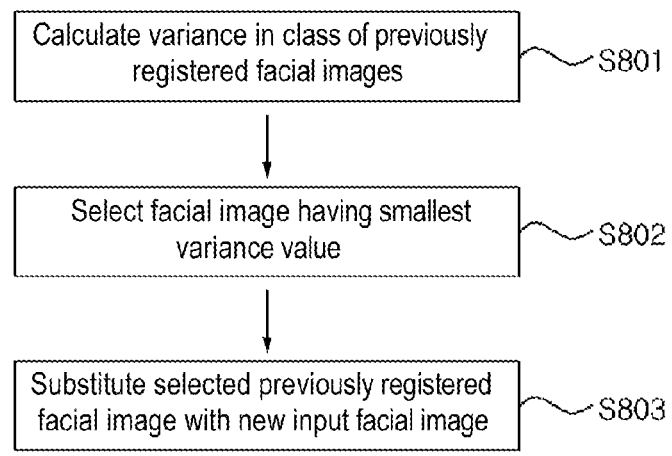

FIG. 8 is a flowchart illustrating a method of selecting a facial image to be substituted with a new facial image from among the previously registered facial images by the pre-registered face substitution unit 130 in accordance with still another embodiment of the present disclosure.

In order to select a facial image to be substituted with a new input facial image from among the previously registered facial images, the pre-registered face substitution unit 130 may, according to the other embodiment, calculate a variance within a class of the facial images stored in the reference face database 110 and select a facial image having the smallest variance value as an image to be substituted.

Also, in this method, if there are two or more identical facial images as in the embodiment of FIG. 7, this may result in occupying more space in the reference face database 110 while maintaining the same face recognition rate, as compared to the case where there is only one identical facial image, and thus, it may be determined that one of the identical facial images may be deleted. However, one facial image having the smallest variance value by calculating a variance within the entire class may be selected without determining similarities between the facial images in the reference face database 110 on a one-to-one basis.

Referring to FIG. 8, the pre-registered face substitution unit 130 according to the other embodiment of the present disclosure first calculates a variance within a class between the facial images previously registered in the reference face database 110 (S801) and selects a facial image having the smallest variance value (S802) in order to select a previously registered facial image to be substituted. At this point, the process of calculating the variance in the class may use a well-known variance value calculating process. The variance value may also be obtained by selecting one of the previously registered facial images, calculating an average of face recognition matching values of the previously registered facial images other than the selected facial image, and calculating a difference between the face recognition matching value of the one selected previously registered facial image and the average of the other face recognition matching values. Alternatively, the variance value may be obtained by calculating a difference between each of the face recognition matching values and averaging of the entire face recognition matching values instead of excluding one of the previously registered facial images.

Then, the selected image may be substituted with a new facial image (S803) and deleted. At this point, the selected previously registered facial image may also be substituted with a new input facial image.

The method of selecting a new image as a facial image may be additionally registered as described in FIGS. 2 and 4 and the method of selecting an image to be substituted as described in FIGS. 5 to 8 may be combined and used in a variety of ways.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a optical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa.

In the foregoing discussion, although the present disclosure has been described in connection with the specific matters, such as the specific components, the various embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the above-described embodiments, and the appended claims and what are modified equally or equivalently thereto will be considered to fall within the scopes of the present disclosure.

The invention claimed is:

1. A method of managing a reference face database for improving performance of face recognition in a limited memory environment, the method comprising:
   acquiring a new input facial image;
   determining a classification condition relevant to the input facial image with reference to classification conditions of facial images previously registered in the reference face database used for face recognition;
   if the classification condition relevant to the input facial image is a specific classification condition and a facial image relevant to the specific classification condition is less sufficient than a preset threshold value in the reference face database, selecting the input facial image as an image that can be additionally registered in the reference face database; and
   deleting one or more of the facial images previously registered in the reference face database when the input facial image is additionally registered in the reference face database, including:
      selecting an image having the smallest number of times used for the similarity matching among the facial images previously registered in the reference face database; and
      deleting the selected facial image.

2. The method of claim 1, wherein the classification condition of the facial images previously registered in the reference face database includes at least one of a facial expression of the input facial image, an angle of photographing the facial image, a direction of a light cast on the facial image, and a type of a light source.

3. The method of claim 1, wherein whether the facial image relevant to the specific classification condition is less sufficient than the preset threshold value in the reference face database is determined based on an identity of a person included in the input facial image.

4. The method of claim 1, further comprising selecting one or more of the facial images previously registered in the reference face database when the input facial image is additionally registered in the reference face database.

5. The method of claim 1, wherein the step of deleting further comprises:
   selecting the oldest facial image among the facial images previously registered in the reference face database; and
   deleting the selected facial image.

6. The method of claim 1, wherein the step of deleting further comprises:
   counting the number of times each of the facial images previously registered in the reference face database were used for similarity matching, from a preset time point until present, to recognize an identity of a face included in the newly input image.

7. The method of claim 1, wherein the step of deleting comprises:
   determining similarity between the facial images previously registered in the reference face database;
   selecting facial images having the closest similarity between the previously registered facial images in the reference database;
   further selecting one of the selected facial images; and
   deleting the further selected facial image.

8. A method of managing a reference face database for improving performance of face recognition in a limited memory environment, the method comprising:
   acquiring a new input facial image;
   determining a classification condition relevant to the input facial image with reference to classification conditions of facial images previously registered in the reference face database used for face recognition;
   if the classification condition relevant to the input facial image is a specific classification condition and a facial image relevant to the specific classification condition is less sufficient than a preset threshold value in the reference face database, selecting the input facial image as an image that can be additionally registered in the reference face database; and
   deleting one or more of the facial images previously registered in the reference face database when the input facial image is additionally registered in the reference face database, including:
      calculating a variance in a class between the facial images previously registered in the reference face database by:
         calculating an average of face recognition matching values of the previously registered facial images other than the selected facial image; and calculating a difference between a face recognition matching value of the one selected previously registered facial image and the average of the other face recognition matching values;
selecting a facial image having the smallest variance value; and
deleting the selected facial image.

9. The method of claim 8, wherein the step of calculating a variance further comprises:
selecting one of the facial images previously registered in the reference face database.

10. A method of managing a reference face database for improving performance of face recognition in a limited memory environment, the method comprising:
acquiring a new input facial image;
determining a classification condition relevant to the input facial image with reference to classification conditions of facial images previously registered in the reference face database used for face recognition;
if the classification condition relevant to the input facial image is a specific classification condition and a facial imam relevant to the specific, classification condition is less sufficient than a preset threshold value in the reference face database, selecting the input facial image as an image that can be additionally registered in the reference face database; and
deleting one or more of the facial images previously registered in the reference face database when the input facial image is additionally registered in the reference face database, including:
calculating a variance in a class between the facial images previously registered in the reference face database by:
calculating an average of face recognition matching values of the facial images previously registered in the reference face database; and
calculating a difference between the average of the face recognition matching values and a face recognition matching value of each of the previously registered facial image:
selecting a facial image having the smallest variance value; and deleting the selected facial image.

11. A reference face database managing apparatus for improving performance of face recognition in a limited memory environment, the apparatus comprising:
a reference face database configured to record a facial image used for face recognition; and
an additional registration face selection unit configured to determine a classification condition relevant to a new input facial image with reference to classification conditions of facial images previously registered in the reference face database, if the input facial image is acquired, to select the input facial image as an image that can be additionally registered in the reference face database, if the classification condition relevant to the input facial image is a specific classification condition and a facial image relevant to the specific classification condition is less sufficient than a preset threshold value in the reference face database and to delete one or more of the facial images previously registered in the reference face database when the input facial image is additionally registered in the reference face database, including selecting an image having the smallest number of times used for the similarity matching among the facial images previously registered in the reference face database and deleting the selected facial image.

12. The apparatus of claim 11, wherein the reference face database includes at least one of a facial expression of the input facial image, an angle of photographing the facial image, a direction of a light cast on the facial image, and a type of a light source, as the classification conditions of the previously registered facial images.

13. The apparatus of claim 11, wherein the additional registration face selection unit is configured to determine whether or not the facial image relevant to the specific classification condition is less sufficient than the preset threshold value in the reference face database based on an identity of a person included in the input facial image.

14. The apparatus of claim 11, further comprising a pre-registered face substitution unit configured to selecting some of the facial images previously registered in the reference face database when the input facial image is additionally registered in the reference face database.

15. The apparatus of claim 14, wherein the pre-registered face substitution unit is configured to select and delete the oldest facial image from among the facial images previously registered in the reference face database.

16. The apparatus of claim 14, wherein the pre-registered face substitution unit is configured to determine a similarity between the facial images previously registered in the reference face database, and select and delete facial images having the closest similarity between the previously registered facial images.

17. The apparatus of claim 16, wherein in determining the similarity, the pre-registered face substitution unit is configured to determine that similarity between two corresponding facial images is high as a difference between matching values is small, using the difference between the matching values for face recognition in the facial images previously registered in the reference face database.

18. The apparatus of claim 14, wherein the pre-registered face substitution unit is configured to calculate a variance in a class between the facial images previously registered in the reference face database, and select and delete a facial image having the smallest variance value.

* * * * *